United States Patent
Varadarajalyengar (10) Patent No.: US 11,720,531 B2
(45) Date of Patent: Aug. 8, 2023

(54) AUTOMATIC CREATION OF DATABASE OBJECTS

(71) Applicant: SAP SE, Walldorf (DE)

(72) Inventor: Vinutha Yediyur Varadarajalyengar, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/408,619

(22) Filed: Aug. 23, 2021

(65) Prior Publication Data

US 2023/0054519 A1 Feb. 23, 2023

(51) Int. Cl.
*G06F 16/00* (2019.01)
*G06F 16/21* (2019.01)

(52) U.S. Cl.
CPC .................. *G06F 16/211* (2019.01)

(58) Field of Classification Search
CPC ....................................... G06F 16/211
See application file for complete search history.

(56) References Cited

U.S. PATENT DOCUMENTS

| | | | | |
|---|---|---|---|---|
| 2003/0042319 A1* | 3/2003 | Moore | ................. | G06V 30/416 235/494 |
| 2006/0085465 A1* | 4/2006 | Nori | ...................... | G06F 16/213 |
| 2008/0050019 A1* | 2/2008 | Morohoshi | ........ | G06V 30/1448 382/187 |
| 2010/0114817 A1* | 5/2010 | Broeder | ................ | G06F 16/289 707/612 |
| 2011/0161375 A1* | 6/2011 | Tedder | .................. | G06F 16/958 715/234 |
| 2012/0124547 A1* | 5/2012 | Halbedel | ............... | G06F 16/903 707/769 |
| 2013/0067319 A1* | 3/2013 | Olszewski | ............ | G06F 40/117 715/234 |
| 2014/0369602 A1* | 12/2014 | Meier | .................. | G06V 30/412 382/182 |
| 2017/0147660 A1* | 5/2017 | Rajasekar | ............. | G06F 16/211 |
| 2018/0150540 A1* | 5/2018 | Florendo | ............... | G06F 16/273 |
| 2019/0235752 A1* | 8/2019 | Tashiro | ................ | G06F 3/0488 |
| 2019/0340240 A1* | 11/2019 | Duta | ...................... | G06V 30/15 |
| 2020/0175304 A1* | 6/2020 | Vig | ....................... | G06V 30/413 |
| 2021/0026623 A1* | 1/2021 | Me | ........................... | G06F 8/33 |
| 2021/0303836 A1* | 9/2021 | Kasatani | ............. | G06F 3/04883 |

* cited by examiner

*Primary Examiner* — Syed H Hasan
(74) *Attorney, Agent, or Firm* — Sterne, Kessler, Goldstein & Fox P.L.L.C.

(57) ABSTRACT

Disclosed herein are various embodiments for a system for the automatic creation of database objects. An embodiment operates by receiving an image of a definition of an unknown type of database object to be created in a database. A first keyword of one or more keywords is identified in a text of the image, wherein the text includes one or more values associated with the first keyword. It is determined that the unknown type of database object corresponds to the first type of database object based on the identified keyword. A database object of the first type of database object is generated for the database based on the one or more values.

20 Claims, 5 Drawing Sheets

Input class repository image

Class: CL_MASTER_DATA
Interface: if_FSBP_MASTER_DATA
Methods: Constructor
Methods: GET_BP_DATA           Exporting ET_DATA TYPE BUTOOO_T
Methods: Get_bank_data         Exporting ET_BANK_DATA type BUTOBK_T
Attributes: mt_old_data        Type CVIS_EI_EXTERN_T

320

Interpretation engine using ML Algorithm

330

Output as json

'{"Datasource_Class":{"Class":{"name":"CL_MASTER_DATA"},
"Interface":{"name":"if_FSBP_MASTER_DATA"},"Methods":[{"name"
Constructor"},{"name":"Get_bank_data Exporting ET_BANK_DATA type
BUTOBK_T"}],"Methods":{"name":"GET_BP_DATA Exporting ET_DATA TYPE
BUTOOO_T"}, "attributes":{"name":"mt_old_data type CVIS_EI_EXTERN_T"}}}'

AUTOMATIC CREATION OF DATABASE OBJECTS

BACKGROUND

Creating database objects used to store or organize data, such as tables, can be a slow and time consuming process. This process often requires a customer to design requirements for the table using a specific design tool or program. This program file is then provided to a database host administrator, who would try to understand the file, and be tasked with manually creating each table or other database object in the file on the host side for the database in accordance with the file. This manual process is time consuming, resource intensive, and prone to human errors. Further, the process delays system productivity and data creation. The manual process becomes a greater bottleneck to productivity as the number, complexity, and/or types of database objects to be created increase.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Creating database objects used to store or organize data, such as tables, can be a slow and time consuming process. This process often requires a customer to design requirements for the table using a specific design tool or program. This program file is then provided to a database host administrator, who would try to understand the file, and be tasked with manually creating each table or other database object in the file on the host side for the database in accordance with the file. This manual process is time consuming, resource intensive, and prone to human errors. Further, the process delays system productivity and data creation. The manual process becomes a greater bottleneck to productivity as the number, complexity, and/or types of database objects to be created increase.

Figure 1:
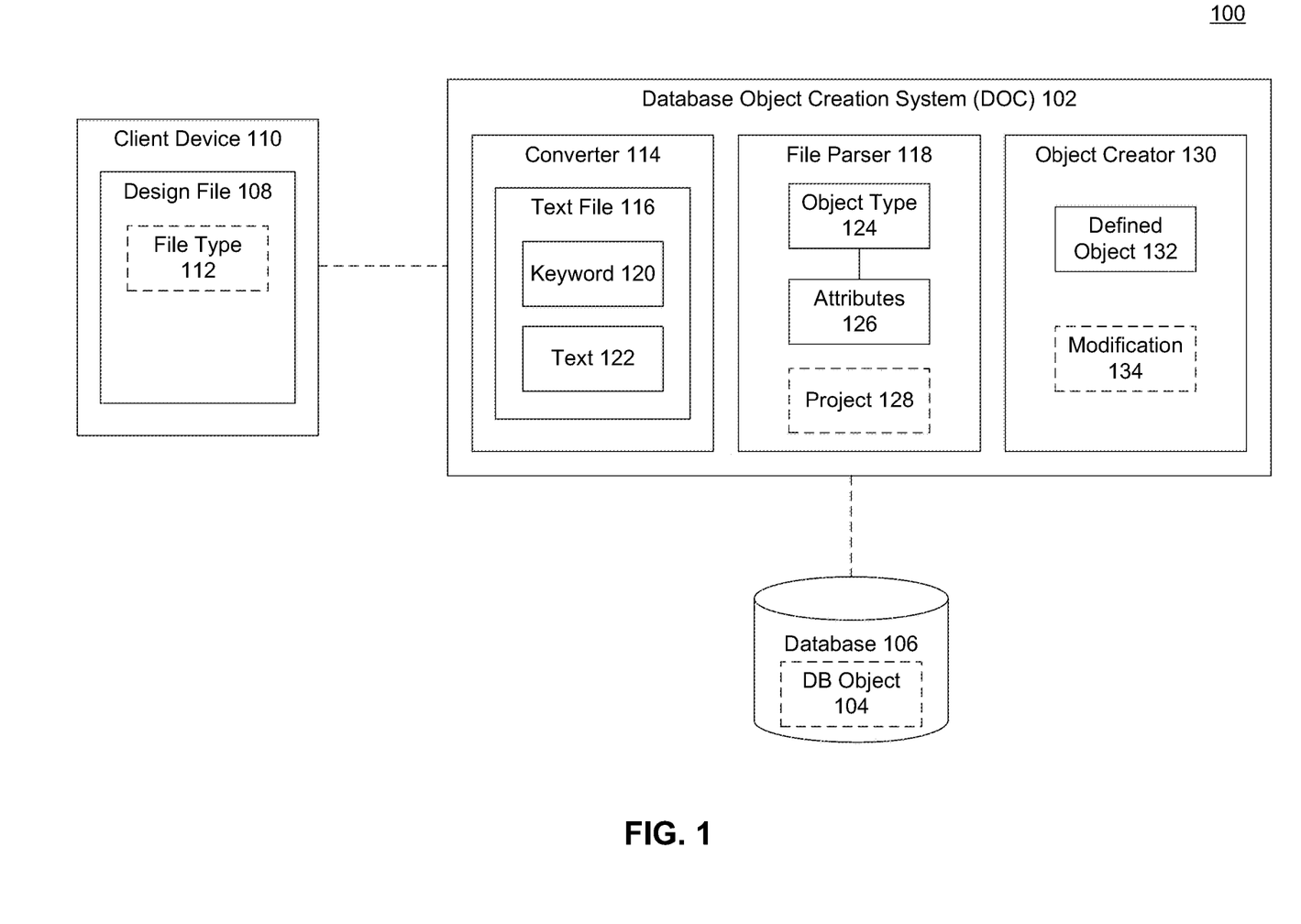
FIG. 1 is a block diagram illustrating functionality for a database object creation system (DOC), according to some example embodiments.

FIG. 1 is a block diagram 100 illustrating functionality for a database object creation system (DOC) 102, according to some example embodiments. DOC 102 may enable for automated, faster, and/or more efficient creation of database objects 104.

A database (DB) object 104 may be a data structure used to store and/or reference data in a database 106. In some embodiments, the database object 104 may be any data structure, including but not limited to data structures stored in repositories or databases. In some embodiments, database objects 104 may be stored in program files or as separate files unto themselves outside of repository structure or database 106. Example database objects 104 include, but are not limited to, tables, indexes, stored procedures, methods, variables, sequences, views, synonyms, and classes. DOC 102 may create any of these types of database objects 104 in a file, repository, or for database 106 (or multiple different databases).

In some embodiments, each type of database object 104 may include its own syntax, structure, format, and/or attributes. For example, a table object may include a set of attributes corresponding to the various columns of the table, while a class object may include variables and/or methods associated with the class. In some embodiments, two different types of database objects 104 may include similar attributes. For example, both a class object and an interface object may include methods. In some embodiments, the syntax of creating a class may begin with class name, variable names, and then method names.

As noted above, creating a database object is generally a time consuming and resource intensive process, prone to human errors. The process often begins with an administrator of the data defining the object using a separate design tool program with a the definitions of the objects provided in a specific or human-understandable format. One example design tool program is VISIO.

Once the data administrator has defined the one or more objects to be created using the design tool program, the file may then be provided to an administrator of a database. This database administrator would then have to manually review and try and understand what objects or structures are to be created. The database administrator would then need to manually enter or create all the desired objects in the provided file based on their best understanding, which again is an error prone process. Once the job is completed, or any questions arise, the database administrator may then need to communicate with the administrator of the data to answer any questions and verify whether the objects were correctly defined. Finally, the object could be created in the database.

DOC 102 reduces the time and resources required to create a new database object 104 for a database 106. Database 106 may include any database, repository, file structure, or storage mechanism, including either a column-oriented and/or row-oriented database. In some embodiments, database 106 may refer to multiple different databases or data stores across different devices, for which the same database object 104 is created multiple times in multiple different devices or databases 106.

In some embodiments, DOC 102 may receive a design file 108 from a client device 110. Rather than being a formalized document from a specific design tool program, design file 108 may be any document, in any format, that includes information about database objects 104 that are to be created for database 106.

For example, a data administrator may write out, by hand, a new definition for a new database object 104, and use their mobile phone or laptop (e.g., client device 110) to take a picture of the hand-written definition and upload the image to DOC 102 as design file 108. Or, for example, design file 108 may be a screenshot, or a word processing document that includes all the information needed to create a database object 104. Or, for example, the design file 108 may be an image of a print out of a design tool structure, with hand written notes.

File type 112 may indicate a file type or extension related to the design file 108 or the program used to create design file. Example file types 112 include, but are not limited to, .jpg, .img, .doc, .gif, .docx, .pdf, and .ppt. In some embodiments, design file 108 may include multiple files of different file types 112, and each design file 108 may include the definition for one or more different types of database objects 104 to be created or modified across one or more databases 106.

In some embodiments, a converter 114 may convert the design file 108 into a text file 116, if needed. In some embodiments, converter 114 may detect whether design file 108 is in a text-based format (e.g., word processing, spreadsheet, or other document format that includes readable/searchable text). If it is determined that the uploaded design file 108 is an image file format or other non-text-based format, converter 114 may convert the design file 108 into a text file 116. Text file 116 may include any file in which the text of design file 108 may be read, searched, or otherwise parsed by a computing system.

In some embodiments, converter 114 may include an OCR (optical character recognition) engine that can convert an image file, which may include either computer-generated and/or hand-written notations, into text file 116.

In some embodiments, DOC 102 may receive text file 116 directly from client device 110 as design file 108, and determine no conversion needs to take place on design file 108 because it already includes computer-readable text. The design file 108 may be then used as text file 116, as described herein.

In some embodiments, a first design file 108 may be in a text file 116 format, while a second design file 108 that may include additional information related to the first design file 108 may be an image file (which does not include computer-readable text) that is converted by converter 114 into text file 116. DOC 102 may then use both text files to create one or more database objects 104 for database 106.

In some embodiments, text file 116 may include an intermediate file format with a specific structure or font, and all design files 108 may be converted into the intermediate file format which is then provided to or made available to a file parser 118.

File parser 118 may parse or search the text file 116 for various phrases, symbols, and/or data to identify what type of database object 104 to create and what are the features of the database object 104 to be created. In some embodiments, file parser 118 may parse or search text file 116 for a set of one or more keywords 120 and related text 122.

Keyword 120 may be one or more predefined words, phrases, or symbols that designate an object type 124 or attribute 126 of a database object 104. Object type 124 may indicate the type of database object that is to be created. As noted above, example object types 124 include but are not limited to tables, indexes, stored procedures, sequences, views, synonyms, and classes. In some embodiments, the corresponding keywords 120 that are searched for or identified in text file may be: "table", "index", "stored procedure", "sequence", "view", "synonym", and "class".

As another example keyword 120 may be "T+" which may indicate a table object, and may be shorthand that quickens the design process by requiring less text to be provided in the design file 108 and subsequently processed by DOC 102.

In some embodiments, file parser 118 may search text file 116 and identify the keyword "table". The keyword "table" may be interpreted as an intent or desire to create an object type 124 of table, or modify an existing table object (e.g., database object 104) in database 106. The subsequent text 122 after the "table" keyword 120 may be interpreted as various features or attributes 126 of the table to be created, which itself may include additional keywords 120.

Example attributes 126 include, but are not limited to, a table name, column names, data types, column width, etc. In some embodiments, different attributes 126 may include their own keywords 120. For example, a column designation may include the keyword 120 "C", "Col", or "Column" in the text file 116.

An example text file 116 with attribute 126 keywords may include the following text 122:

Table Customers, Col: Name, C: Address, Column: Account Balance ($)

Or for example, another example text file 116 without attribute 126 keywords may include the following text 122:

Table Customers, Name, Address, Account Balance ($)

In the first example text file 116, file parser 118 may identify the keywords 120: Table, Col, C, and Column with the attributes 126 Customers, Name, Address, Account balance, and ($). In the second example, the only keyword 120 identified may be Table. These keywords and values may be provided to an object creator 130 which may use the values which may create, for either text file 116, a new table named Customers, with three columns: Name, Address, and Account Balance. Object creator 130 may further assign an integer/dollar currency data type to the Account Balance column as indicated by the value within the parenthesis.

Defined object 132 may include a definition of a new or modified database object 104 that was created based on identified keywords 120, text 122, object type 124, and attributes 126. In some embodiments, defined object 132 may be modifiable or viewable by various users before the corresponding database object 104 is created in database 106 and made available for data storage or access. For example, the defined object 132 may include an intermediary format or outline of the object in a program before data has been populated to the defined object 132 in database 106. Once the defined object 132 is approved by a data administrator, the corresponding database object 104 may be created, populated with data, or may otherwise be accessible from database 106.

In some embodiments, file parser 118 may detect and resolve ambiguities in the text 122 or keywords 120 of text file 116. Ambiguities may include any variety of issues, including but not limited to, missing words or data and misspellings. In some embodiments, file parser 118 may utilize machine learning and/or artificial intelligence technologies that enables file parser 118 to interpret words properly in spite of spelling or grammatical errors that may exist in text file 116. For example, file parser 118 may be able to interpret "Tabel" or "tabbel" as "Table".

In some embodiments, if file parser 118 cannot resolve the ambiguity, then the words or commands of text file 116 may be ignored or skipped. For example, if text file 116 includes the word "Tavke", which is ambiguous whether or not a "Table" is intended and does not closely match any other keyword 120, DOC 102 may skip the "Tavke" and any following text 122 until a next interpretable keyword 120 is identified which is then processed.

In some embodiments, file parser 118 may send a notification to client device 110 when an ambiguity is detected, and request clarification from a user. For example, if file parser 118 detects "Tabble" and interprets the word as "Table", the notification may request for the user to confirm or reject the interpretation before or after defined object 132 is created. In some embodiments, file parser 118 may ask the user to re-enter (using a keyboard on or associated with client device 110) the word(s) or phrase that was flagged as unknown or including the ambiguity. For example, if the user rejects the "Table" interpretation for "Tabble", the user may enter, using a keyboard or voice command, the corrected phrase "Tabby" which may be the name of a method, variable, or column.

In some embodiments, file parser 118 may detect that the text file 116 includes the name of an already existing database object 104. In some embodiments, this may prompt an ambiguity response by DOC 102 as described above, such as skipping the command or sending a notification to the user indicating a duplicate name and requesting corrective action.

In some embodiments, DOC 102 may be configured to delete or edit/modify existing database objects 104. For example, if file parser 118 detects a "Delete" keyword 120, the following text 122 may be interpreted as what features of which existing database object 104, are to be deleted from database 106. For example, with the delete command, a client or customer or administrator may delete an entire table, or a specified column of a table. In this case, file parser 118 may detect an resolve and ambiguity if the specified database object 104 from text file 116 cannot be identified in database 106.

If file parser 118 detects an "Edit" keyword 120, the identified database object 104 may be modified based on the text 122 following the "Edit" keyword 120, which may include adding attributes 126 such as a column to a table, changing a column name, or adding a new method to a class. These commands may include their own keywords 120.

In the case of creating or modifying a database object 104, defined object 132 may be the newly created or updated/modified database object 104. In some embodiments, DOC 102 may provide client device 110 with access to a defined object 132 for verification or modification 134. For example, an administrator or other user may modify the defined object 132 directly by submitted modification 134 text through a keyboard of client device 110, or may submit a new design file 108 with an "Edit" command. In some embodiments, any ambiguities that were detected by file parser 118 may have been flagged and provided to client device 110 during this verification step. The user may then provide a modification 134 that includes new text, replacement text, or deletes/skips the ambiguity.

In some embodiments, the text file 116 may include or indicate the name or code of a particular project 128. Project 128 may be any indicator that identifies which data partition or database 106 to use, or what label or metadata to assign to the objects detected in text file 116. In some embodiments, project 128 may indicate a client name, which may be associated with a particular database 106 for which to create the specified database object 104 in a particular format for that client. For example, a particular company may include different databases 106 or storage partitions, each of which having its own unique formatting or data associations. Project 128 may indicate to DOC 102 to which project or client to associate the defined object 132.

In some embodiments, project 128 may indicate or correspond to a particular formate for defined objects 132 or database objects 104 to be modified or created. For example, a first project 128 may indicate that for methods, all the letters of the method name are lowercase, while a second project 128 may indicate that the first letter of method names are always capitalized. Based on an optionally identified project 128, DOC 102 may correspondingly and uniformly format or structure defined objects 132 and/or database objects 104.

In some embodiments, text file 116 may designate or include multiple keywords 120 for multiple database objects 104 to be created or modified. In these embodiments, file parser 118 may detect a first keyword 120 and associate all the following text 122 with the particular object type 124 corresponding to the first keyword 120 until an end of object marker (such as the word "End" or symbol such as "*"), the next keyword 120, or an end of the file (E-O-F) is detected. If another keyword 120 is detected, then a second database object 104 may be created, which may be the same or a different object type 124 than the first object type 124 corresponding to the first keyword 120.

Figure 2:
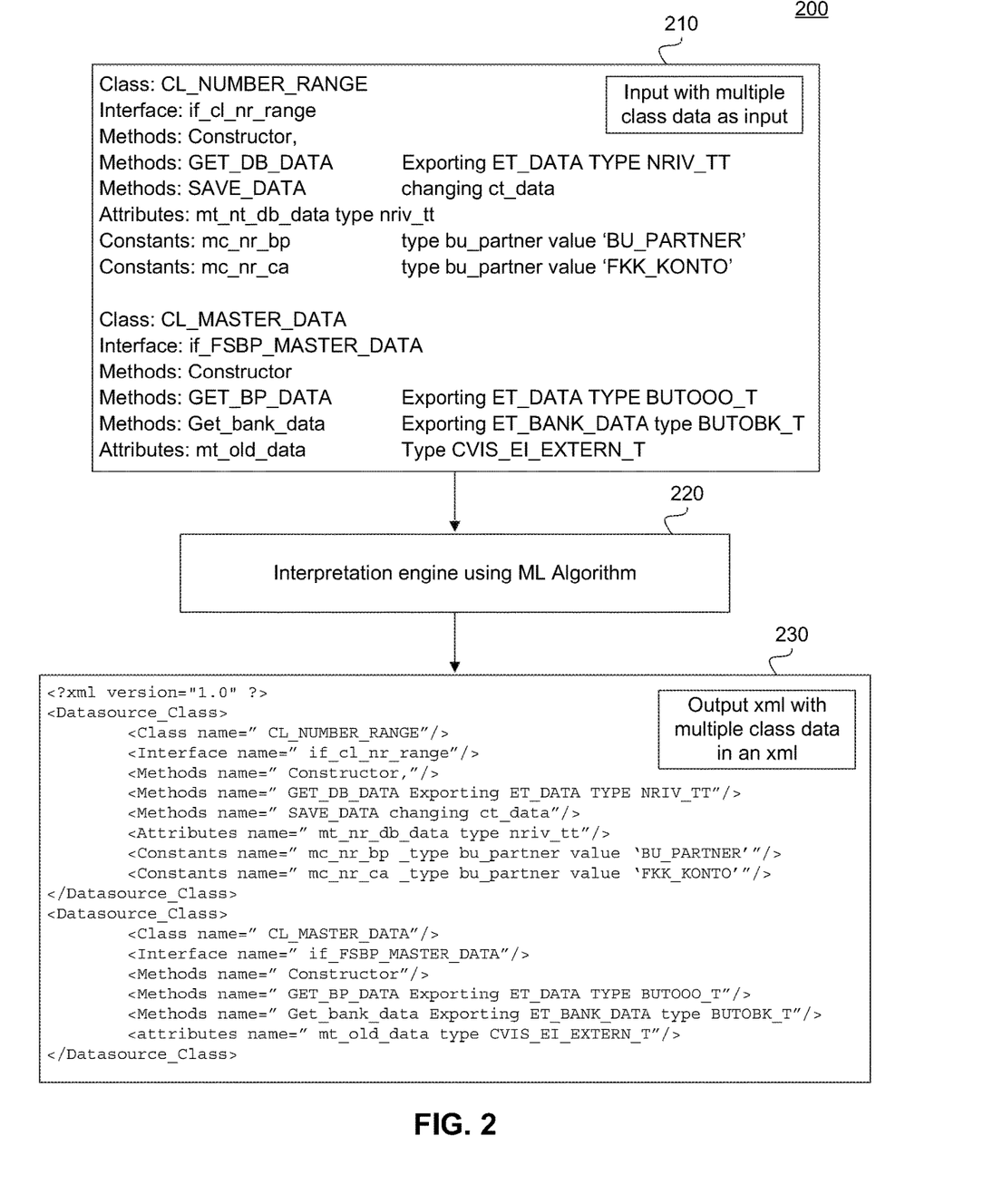
FIG. 2 illustrates example operations of a system for the automatic creation of database objects, according to some embodiments.

FIG. 2 illustrates example operations of a system 200 for the automatic creation of database objects, according to some embodiments. Box 210 illustrates an example input or text file (e.g., text file 116) with multiple classes to be created. As noted above, the text file may be an image (e.g., design file 108) that has been converted into a computer-readable format.

Box 220 illustrates an interpretation engine using machine learning algorithms that normalizes, reads, and parses the text file of box 210. In some embodiments, the interpretation engine may include the operations of both the file parser 118 and object creator 130 described above with respect to DOC 102.

Box 230 illustrates an example defined object (e.g., defined object 132). In the example of Box 230, the defined object may be output as XML (extensible markup language) code. In some embodiments, the output XML may include the methods, attributes, associations, and inheritance details that may be required by XML. The XML output may be interested by any programming language and thus, DOC 102 may generate a programming language independent output that could be used across different programs, applications, and/or databases 106.

Figure 3:
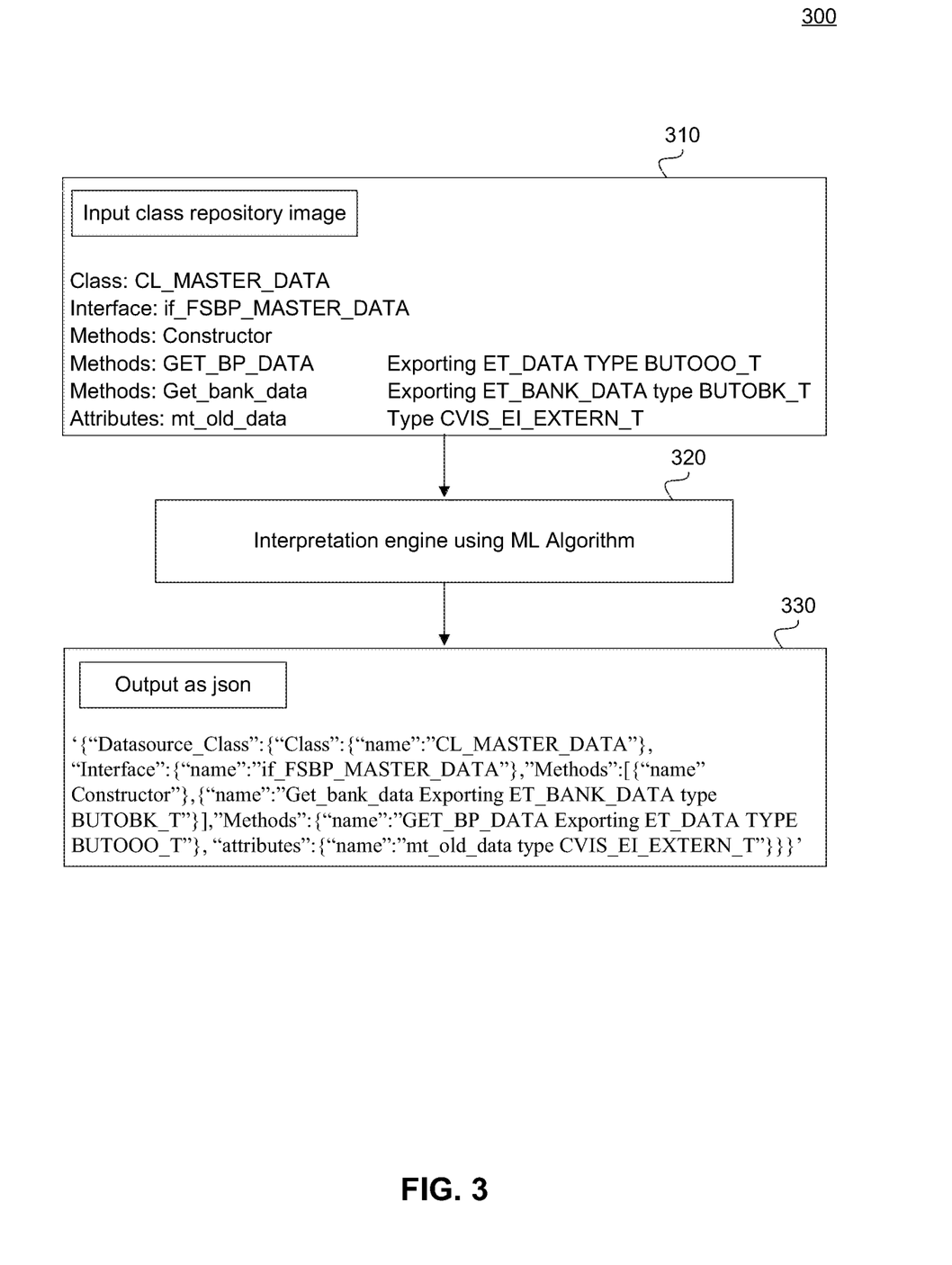
FIG. 3 illustrates example operations of a system for the automatic creation of database objects, according to some additional embodiments.

FIG. 3 illustrates example operations of a system 300 for the automatic creation of database objects, according to some additional embodiments. Box 310 illustrates an example input or text file (e.g., text file 116) with a classes to be created. As noted above, the text file may be an image (e.g., design file 108) that has been converted into a computer-readable format.

Box 320 illustrates an interpretation engine using machine learning algorithms that normalizes, reads, and parses the text file of box 310. In some embodiments, the interpretation engine may include the operations of both the file parser 118 and object creator 130 described above with respect to DOC 102.

Box 330 illustrates an example defined object (e.g., defined object 132). In the example of Box 330, the defined object may be output as JSON (JavaScript Object Notation) code. JSON is another example of a language-independent data format. In other embodiments, DOC 102 may generate language-specific output or defined objects. For example, in some embodiments, the project 128 attribute may indicate or correspond to one or more programming languages for which to output the defined object 132. For example, a user may specify defined objects 132 in JSON and/or XML.

Figure 4:
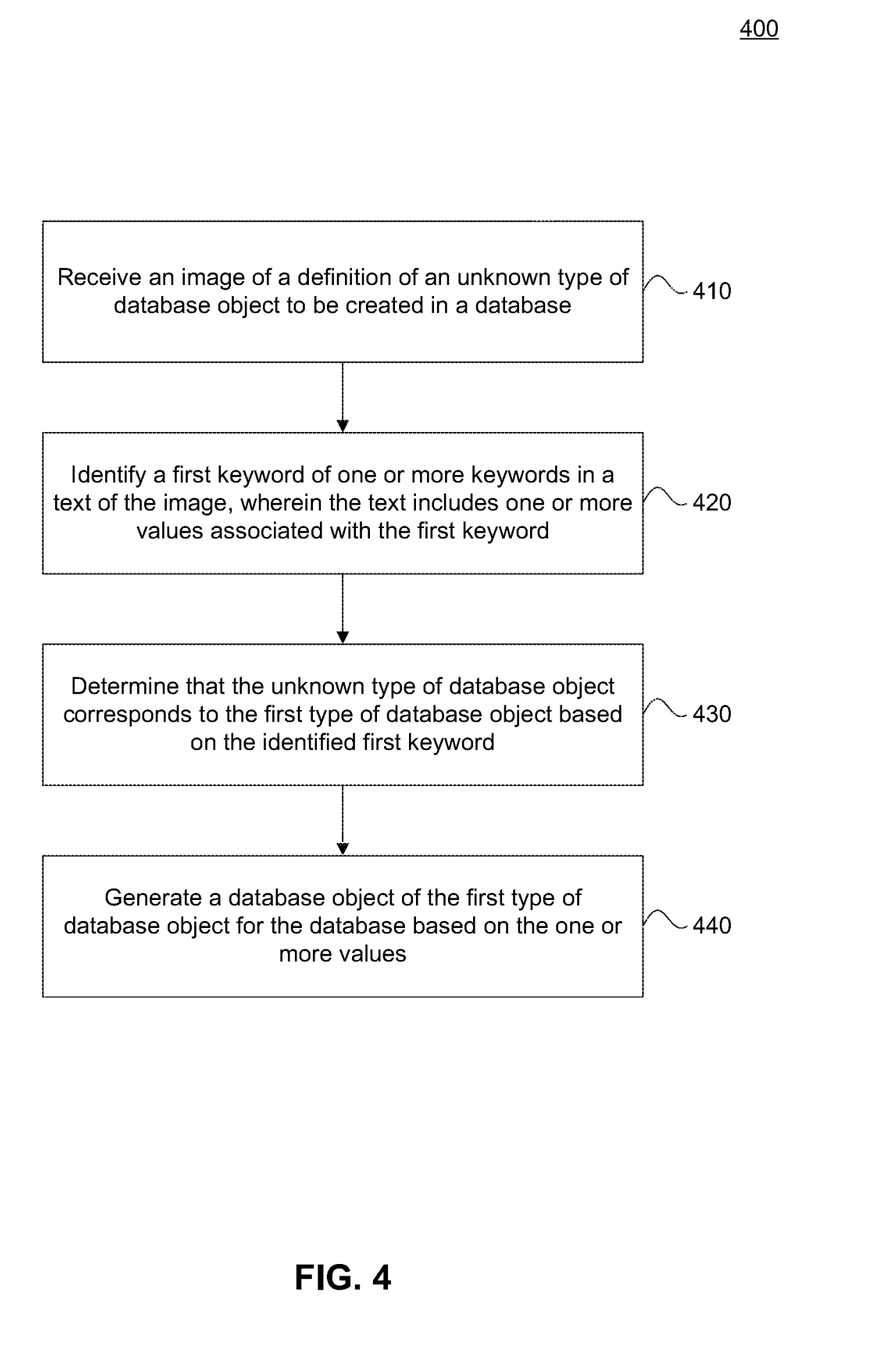
FIG. 4 is a flowchart illustrating example operations for functionality related to a database object creation system (DOC), according to some embodiments.

FIG. 4 is a flowchart 400 illustrating example operations for functionality related to a database object creation system (DOC) 102, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to the figures.

In 410, an image of a definition of an unknown type of repository object to be created in a database is received. For example, DOC 102 may receive design file 108, which may be a picture from a camera of handwritten notes or a print-out, or a screen shot of a screen. There may be multiple different object types 124 that may be created in any given design file 108. Upon receiving the design file 108, DOC 102 may not yet know which object type 124 is to be created.

In 420, a first keyword of the one or more keywords are identified in a text of the image, wherein the text includes one or more values associated with the first keyword. For example, converter 114 may convert the image design file 108 into a text-readable text file 116. File parser 118 may then identify a keyword 120 and corresponding text 122 in text file 116.

In 430, it is determined that the unknown type of repository object corresponds to the first type of repository object based on the identified keyword. For example, file parser 118 may determine that the keyword 120 corresponds to a particular object type 124 to be created. Example object types include tables, views, and classes.

In 440, a repository object of the first type of repository object is generated for the database based on the one or more values. For example, object creator 130 may create a defined object 132 based on the information extracted from text file 116, and create a corresponding database object 104, which may then be populated with data and or otherwise accessed.

Figure 5:
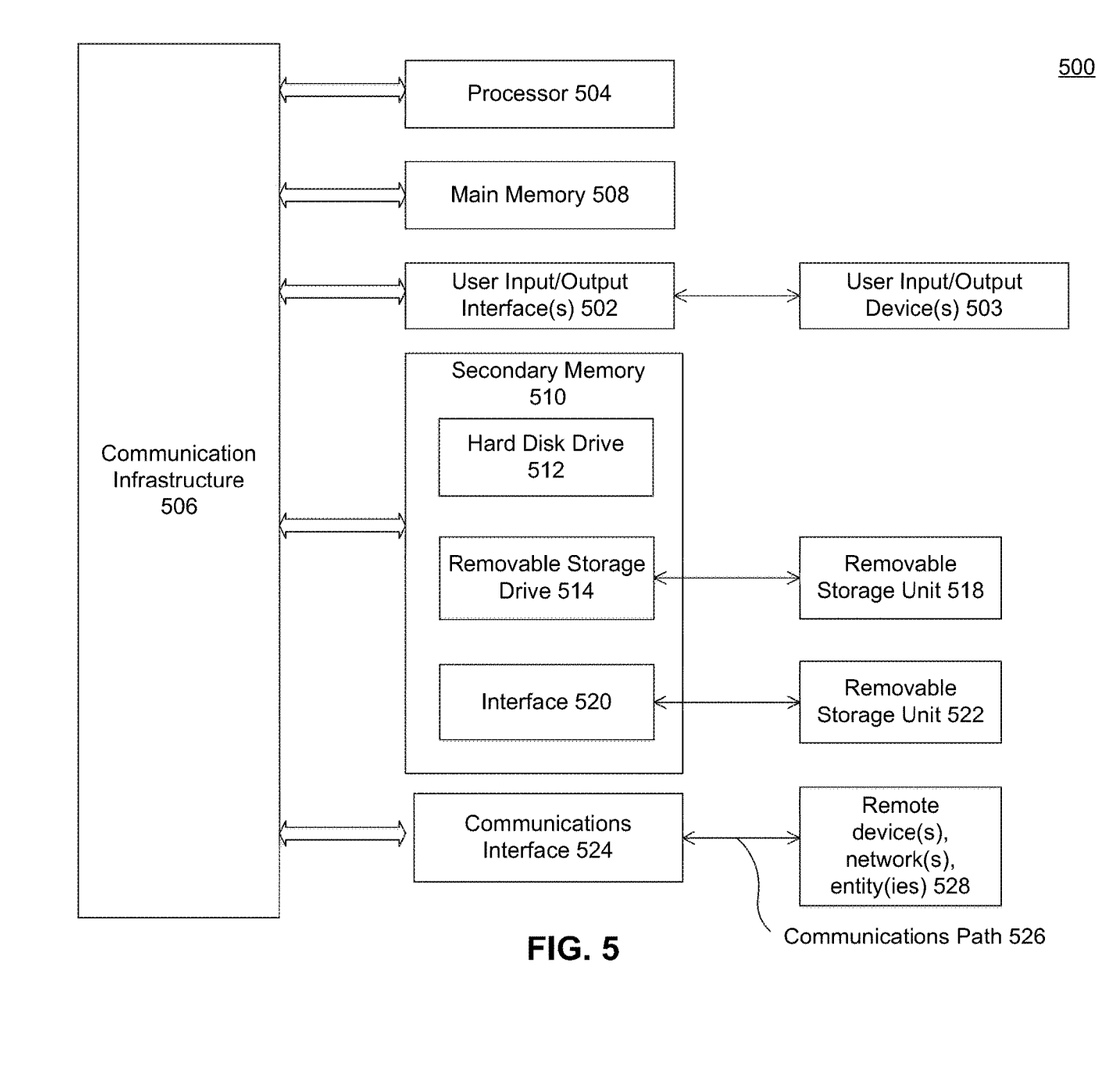
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include customer input/output device(s) 503, such as monitors, keyboards, pointing devices, etc., which may communicate with communication infrastructure 506 through customer input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random-access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    receiving an image of text corresponding to a definition of a database object to be created in a database, wherein the database supports a plurality of different types of database objects, and wherein each of the plurality of types of database objects is associated with one or more keywords;
    identifying a first keyword of the one or more keywords in a text of the image, wherein the text includes one or more values associated with the first keyword, and wherein the identified first keyword corresponds to a first type of database object from the plurality of types of database objects;
    determining that the database object corresponds to the first type of database object based on the identified keyword;
    detecting an end of object marker indicating an end of the database object;
    generating an intermediate version of the database object before populating data into the database object;
    providing the intermediate version of the database object for display;
    receiving one or more modifications to the intermediate version of the generated database object; and
    generating the database object of the first type of database object for the database based on the intermediate version and including the one or more modifications.

2. The method of claim 1, wherein the plurality of types of database objects comprise: a table, view, interface, and class.

3. The method of claim 1, further comprising:
    converting, by one or more processors, the image into text.

4. The method of claim 1, wherein the generated database object comprises an extensible markup language (XML) definition of the database object.

5. The method of claim 1, wherein the image comprises an image of a handwritten version of the definition.

6. The method of claim 1, wherein the image comprises two keywords, including both the first keyword corresponding to the first type of the plurality of types of database objects and a second keyword corresponding to a second type of the plurality of types of database objects, wherein the first type is different from the second type.

7. The method of claim 6, wherein the generating comprises generating both a first database object corresponding to the first type and a second database object corresponding to the second type in the database.

8. The method of claim 1, wherein the end of object marker comprises a character symbol.

9. The method of claim 1, further comprising:
    detecting an ambiguity in the text, wherein the providing comprises providing the ambiguity for display, and wherein the receiving one or more modifications comprises input from the user resolving the ambiguity.

10. A system, comprising:
    a memory; and at least one processor coupled to the memory and configured to perform instructions that cause the at least one processor to perform operations comprising:

receiving an image of text corresponding to a definition of a database object to be created in a database, wherein the database supports a plurality of different types of database objects, and wherein each of the plurality of types of database objects is associated with one or more keywords;

identifying a first keyword of the one or more keywords in a text of the image, wherein the text includes one or more values associated with the first keyword, and wherein the identified first keyword corresponds to a first type of database object from the plurality of types of database objects;

determining that the database object corresponds to the first type of database object based on the identified keyword;

detecting an end of object marker indicating an end of the database object;

generating an intermediate version of the database object before populating data into the database object;

providing the intermediate version of the database object for display;

receiving one or more modifications to the intermediate version of the generated database object; and generating the database object of the first type of database object for the database based on the intermediate version and including the one or more modifications.

11. The system of claim 10, wherein the plurality of types of database objects comprise: a table; view, interface, and class.

12. The system of claim 10, the operations further comprising:
converting, by one or more processors, the image into text.

13. The system of claim 10, the operations further comprising:
providing the database object to a developer associated with the image; and
receiving, from the developer, one or more modifications to the generated database object.

14. The system of claim 10, wherein the generated database object comprises an extensible markup language (XML) definition of the database object.

15. The system of claim 10; wherein the image comprises an image of a handwritten version of the definition.

16. The system of claim 10, wherein the image comprises two keywords, including both the first keyword corresponding to the first type of the plurality of types of database objects and a second keyword corresponding to a second type of the plurality of types of database objects, wherein the first type is different from the second type.

17. The system of claim 16, wherein the generating comprises generating both a first database object corresponding to the first type and a second database object corresponding to the second type in the database.

18. A non-transitory computer-readable medium having instructions stored thereon that, when executed by at least one computing device, cause the at least one computing device to perform operations comprising:

receiving an image of text corresponding to a definition of a database object to be created in a database, wherein the database supports a plurality of different types of database objects, and wherein each of the plurality of types of database objects is associated with one or more keywords;

identifying a first keyword of the one or more keywords in a text of the image, wherein the text includes one or more values associated with the first keyword, and wherein the identified first keyword corresponds to a first type of database object from the plurality of types of database objects;

determining that the database object corresponds to the first type of database object based on the identified keyword;

detecting an end of object marker indicating an end of the database object;

generating an intermediate version of the database object before populating data into the database object;

providing the intermediate version of the database object for display;

receiving one or more modifications to the intermediate version of the generated database object; and generating the database object of the first type of database object for the database based on the intermediate version and including the one or more modifications.

19. The non-transitory computer-readable medium of claim 18, wherein the plurality of types of database objects comprise: a table, view, interface, and class.

20. The non-transitory computer-readable medium of claim 18, the operations further comprising:
converting, by one or more processors, the image into text.

* * * * *